Dec. 6, 1949  P. K. McGALL  2,490,225
CAMERA SHUTTER AND FLASHLAMP SYNCHRONIZER INCLUDING
LEVER OPERATED ELECTRIC GENERATOR
Filed June 22, 1946  2 Sheets-Sheet 1
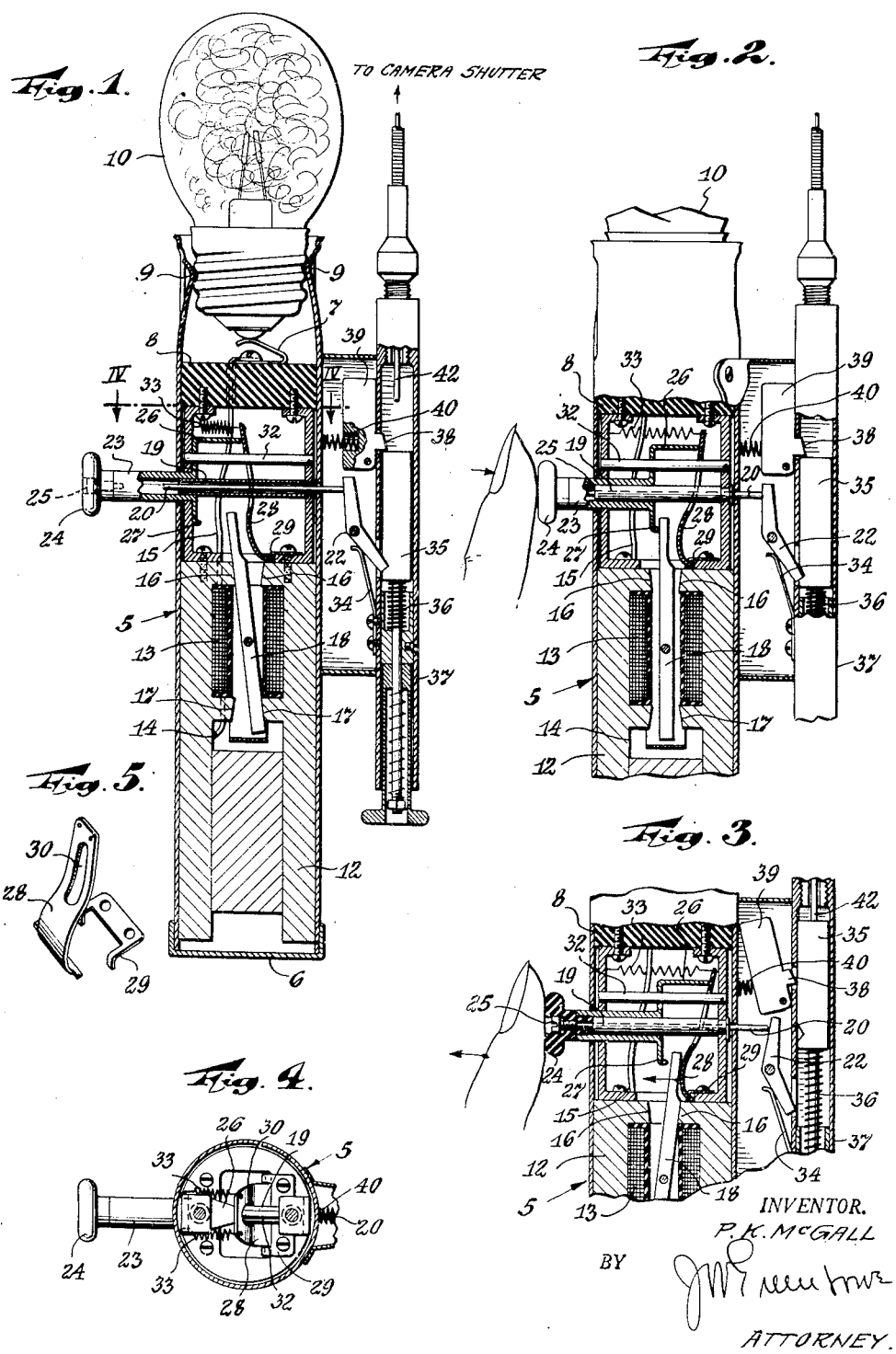
INVENTOR.
P. K. McGALL
BY
ATTORNEY.

Dec. 6, 1949  P. K. McGALL  2,490,225
CAMERA SHUTTER AND FLASHLAMP SYNCHRONIZER INCLUDING
LEVER OPERATED ELECTRIC GENERATOR
Filed June 22, 1946  2 Sheets-Sheet 2

INVENTOR
P. K. McGALL
BY
ATTORNEY

Patented Dec. 6, 1949

2,490,225

UNITED STATES PATENT OFFICE 2,490,225

CAMERA SHUTTER AND FLASH LAMP SYNCHRONIZER, INCLUDING LEVER OPERATED ELECTRIC GENERATOR

Philip K. McGall, Orange, N. J., assignor to Samuel Mendelsohn, Montclair, N. J.

Application June 22, 1946, Serial No. 678,548

3 Claims. (Cl. 95—11.5)

The present invention relates to camera synchronizers and more particularly to a synchronizer which requires no batteries for its operation and constitutes an improvement on the device, as shown and claimed in United States Patent No. 2,328,831, issued September 7, 1943, to the present applicant, as one of the joint inventors.

The device as shown in such prior patent comprises an electric generator for supplying the electrical energy to operate the synchronizer and for igniting the customary photoflash lamp upon movement of generator armature. Such movement is caused by the photographer depressing a button which also operates to cause the camera shutter to completely open at the moment of peak intensity of the photoflash lamp. This synchronization of complete opening of the camera shutter with the movement of peak intensity is accomplished by proper adjustment of the synchronizer.

The disadvantage of the structure, as shown in the above noted patent, resides in the fact that in depressing the operating button, the photographer must apply a force sufficient to compress a return spring and also overcome the magnetic attraction between the generator armature and its magnetic poles. In practice it has been found that the pressure required to depress the actuating button is excessive for best photographic results because of the possibility of moving the camera and detracts from the ease of operation of the synchronizer.

It is accordingly an object of the present invention to provide a camera synchronizer which requires no batteries for its operation and wherein the pressure required to depress the actuating button is considerably reduced.

Another object of the present invention is the provision of a camera synchronizer requiring no batteries for its operation and wherein a mechanical arrangement is provided which so reduces the pressure required to be exerted upon the actuating button that movement of the generator armature and operation of the synchronizer is facilitated without fear of disturbing the position of the camera during an exposure.

Another object of the present invention is the provision of a camera synchronizer requiring no batteries for its operation and wherein a yoke and cam are provided which reduces the pressure otherwise required of the photographer to operate the device.

A further object of the present invention is the provision of a camera synchronizer having an inertia overcoming member to delay action of the synchronizer in completely opening the camera shutter at the moment of peak intensity of the photoflash lamp.

Still further objects of the present invention will become obvious to those skilled in the art by reference to the accompanying drawings wherein, Fig. 1 is an elevational view in section of a camera synchronizer constructed in accordance with the present invention;

Fig. 2 is a fragmentary sectional view of the synchronizer of Fig. 1 showing one operating position of the apparatus;

Fig. 3 is a fragmentary sectional view similar to Fig. 2 but showing another operating position of the apparatus;

Fig. 4 is a sectional view taken on the line IV—IV of Fig. 1;

Fig. 5 is a perspective view of the cam arrangement forming a part of the camera synchronizer of the present invention;

Figure 6:
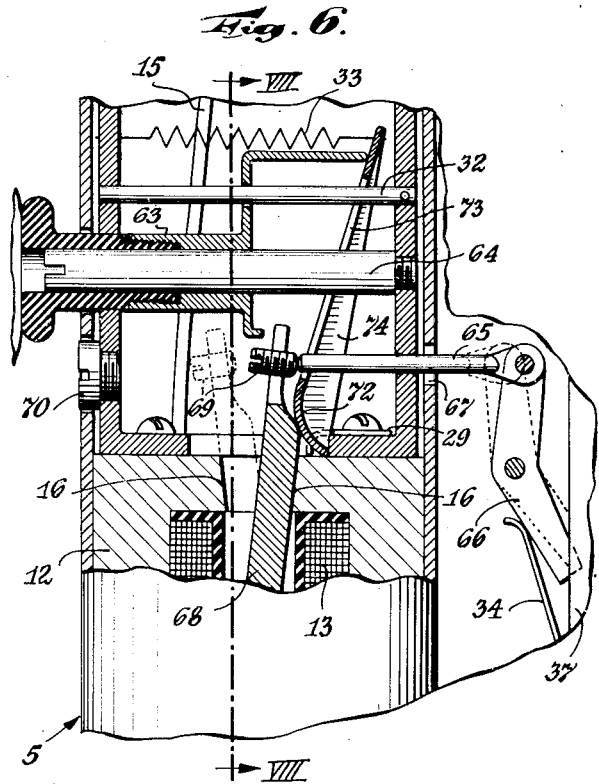
Fig. 6 is a fragmentary sectional view somewhat similar to Fig. 3 and showing a modification which the synchronizer of the present invention may take.

Referring now to the drawings in detail the synchronizer as shown in Fig. 1 comprises a casing 5 closed at one end by an end cap or the like 6 and the opposite open end being provided with a spring contact terminal 7 carried by an insulating block 8, with the upper end of casing 5 being indented at 9 to thus form a socket for a photoflash lamp 10.

The inside of the casing 5 is provided with an electric generator in the form of a permanent magnet 12 and a winding 13 having one end thereof grounded to metallic parts of the casing as at 14 while the remaining end of the winding is connected by a conductor 15 to the spring contact terminal 7, to thus complete a circuit to the photoflash lamp 10. The magnet 12 is provided with upper pole pieces 16 and lower pole pieces 17 and a pivoted armature 18 is maintained in floating condition in the magnetic field of the winding 13 with its upper and lower ends contacting the respective pole pieces 16 and 17.

Extending transversely of the casing 5 is a tubular member 19 which forms a guide for an interiorly disposed push rod 20, the free end of which engages a spring pressed trigger pawl 22. Slidably mounted on the tubular member 19 is a yoke 23 which is operable by a push button 24 so as to engage an adjusting screw 25 with the interior end of the push rod 20. As will be noted from the several figures, the bifurcated portion of yoke 23 is provided with a relatively long arm 26 and a shorter arm 27. In the normal or inoperative position of the synchronizer, as shown in Fig. 1, the longer arm 26 contacts a cam 28 while the shorter arm 27 is spaced therefrom but in line to engage the upper end of the armature 18, upon movement of the yoke 23 along the tubular member 19.

By reference more particularly to Fig. 5 it will be noted that the cam 28 is pivoted at the lower end thereof by passing under a strap 29 which is secured to the interior of the casing 5. The cam 28 is also provided with an elongated slot 30 along its relatively flat surface through which a transversely disposed guide rod 32 passes, so as to confine movement of the cam 28 to one longitudinally of the guide rod 32. Extending from the fulcrum point 29, the cam 28 has a surface of varying radii of curvature which bears against a similar arcuate surface on the end of the armature 18. A pair of relatively light coil springs 33 normally bias the cam 28 in its extreme left hand position, as viewed from Fig. 1, against the long arm 26 of the yoke.

When it is desired to operate the synchronizer the photographer depresses the push button 24 by applying relatively slight pressure with his finger. Initial movement of the yoke 23 longitudinally of the tubular member 19 carries with it the cam 28, since the upper end of the latter is in engagement with the long arm 26, thus causing clockwise rotation of the cam 28 about its pivot 29 together with expansion of the light coil springs 33. Such movement of the yoke then causes the short arm 27 to engage the upper end of the armature 18 with attendant breaking of engagement of its upper and lower ends from the left and right pole pieces 16 and 17, respectively. It can thus be seen that the pressure required by the photographer is relatively slight since it need be only sufficient to expand the light springs 33 and to overcome the magnetic attraction between the armature 18 and its pole pieces 16 and 17. By this time the apparatus will have assumed the position shown in Fig. 2 which now brings the end of the adjustment screw 25 into engagement with the interior end of the push rod 20.

Continued depression of the push button 24 causes further rotation of the cam 28 about its pivot as well as that of the armature 18 until the latter engages the upper right and lower left pole pieces 16 and 17 as shown in Fig. 3. At the same time the push rod 20 will cause rotation of the trigger pawl 22 about its pivot against the tension of its spring 34 thereby releasing the precocked tripping plunger 35 which is under tension of the compressed coil spring 36. The plunger 35 accordingly moves upwardly of its enclosing sleeve 37 where it encounters a projection or sear 38 forming a part of a pivoted block 39 and tensioned by a coil spring 40. This assembly overcomes the initial inertia of the plunger impact and as the block 39 rotates about its pivot and the sear 38 rotates therewith until it passes out of the path of the plunger 35, the latter continues its upward movement until it engages and depresses the camera shutter cable release or Bowden wire 42, thereby opening the camera shutter.

It will be appreciated that the adjusting screw 25 is so regulated that the camera shutter is completely opened at the moment of peak intensity of the photoflash lamp 10, with ample allowance being made for the lamp to reach its peak after initial application of the electrical impulse caused by engagement of the armature 18 with its upper right and lower left pole pieces 16 and 17, as shown in Fig. 3. Upon completion of the exposure the photographer then removes his finger from the push button 24.

The contraction of the light coil springs 33 causes the cam 28 to rotate in a counter-clockwise direction about its pivot 29 and since the cam is in contact with the long arm 26 of the yoke 23, the latter is moved longitudinally to the left along the tubular member 19 to its initial position as shown in Fig. 1. It will also be noted that in rotating in a counter-clockwise direction, the cam 28 exerts a relatively strong pressure on the armature 18 with which it is in contact, due to the high lever ratio when the armature is in contact with the pole pieces 16 and 17, since the spring 33 is exerting full tension on the end of the lever arm opposite to its fulcrum point 29. As the armature 18 moves away from the pole pieces 16 and 17, the contact point between the cam and armature rapidly moves away from the fulcrum point 29 thereby decreasing the lever ratio as the magnetic attraction of the armature decreases in moving away from the pole pieces 16 and 17. Thus an initially strong force is exerted by the cam 28 under tension of the light springs 33 sufficient to return the armature 18 and to cause it to travel counter-clockwise far enough to freely return magnetically to its original position in engagement with the upper left hand pole piece 16 and lower right hand pole piece 17, as shown in Fig. 1, ready for the next exposure.

Accordingly it can be readily seen that very little pressure is required to operate the synchronizer of the present invention since the light return springs 33 presents very little resistance as the yoke arm 26 contacts the cam 28 at about the point where the springs 33 are attached to the cam 28 and the latter is pushed out of the way of free firing and plunger tripping motion of the button and armature, as shown in Fig. 2. Moreover, contact of the short yoke arm 27 with the armature 18 applies the force exerted upon the push button 24 directly to the armature 18, thus readily overcoming the magnetic attraction and when the push button 24 is released following the exposure the cam 28 with its shifting lever ratio just as readily returns the armature to its original position under urging by the very light cam return springs 33.

Figure 7:
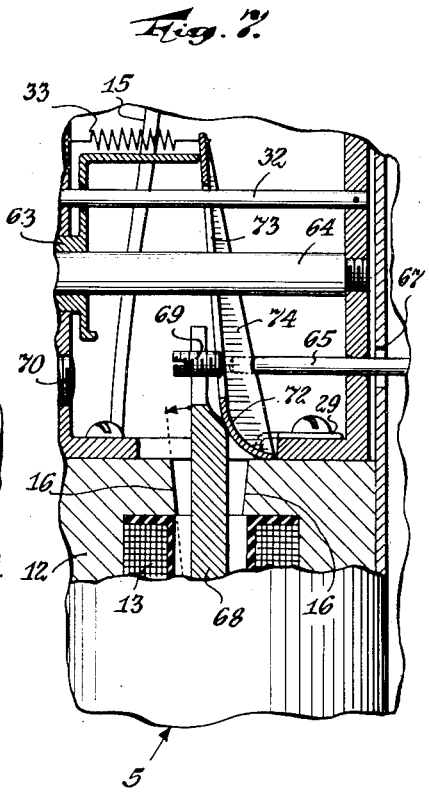
Fig. 7 is a view similar to Fig. 2 showing one operating position of the modification as shown in Fig. 6.
Figure 8:
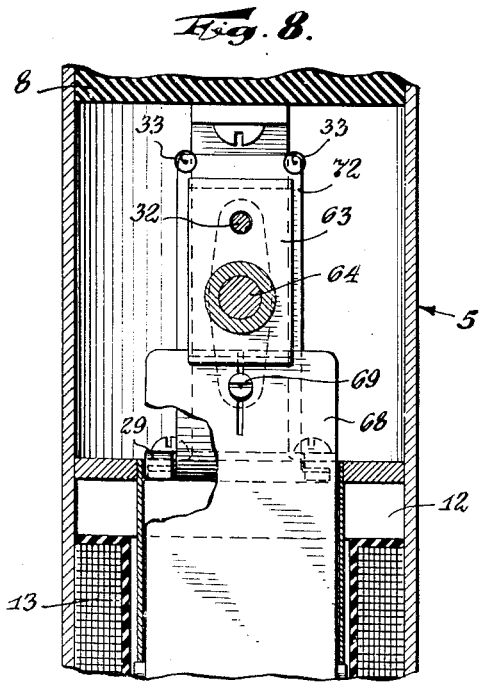
Fig. 8 is a sectional view taken on the line VIII—VIII of Fig. 6.
Figure 9:
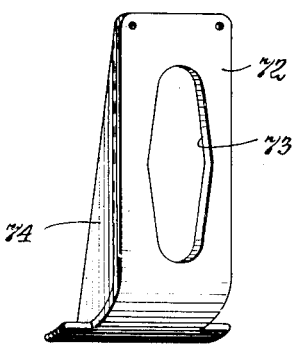
Fig. 9 is a perspective view of the cam portion of the apparatus as shown in the modification of Fig. 6.

The modification of the present invention as shown in Figs. 6 to 9 differs from that previously described only in slight mechanical details. For example, in this modification the yoke 63 moves longitudinally of the tubular member 64 as before but the push rod 65 is pivotally connected to the trigger pawl 66 and passes through an opening 67 in the casing 5. Within the casing the armature 68 is provided with an adjusting screw 69 in axial alignment with the push rod 65, so that movement of the armature to its extreme clockwise rotative position causes the adjusting screw to contact the push rod and operate the latter in the same manner as previously described. To render the adjusting screw 69 accessible from the exterior of the casing 5, the latter is provided with a cap-screw 70. Also in this modification the cam 72 is provided with a somewhat larger elongated slot 73, as shown more clearly in Fig. 9, to enable the tubular member 64 as well as the push rod 65 to pass therethrough, and such cam 72 has side-walls 74 to impart rigidity thereto. In all other respects the modification of Figs. 6 to 9 is substantially identical to that previously described relative to Figs. 1 to 5.

It will be noted, however, that in this modification the operation of the push-rod 65 is independent of the direct pressure applied to the push-button 25 since the armature 68 actually operates the push-rod so that the pressure required need be only sufficient to slide the yoke 63 and overcome the magnetic attraction of the armature. This accordingly eliminates entirely the human element from that of the previous modification in so far as operation of the push-rod 65 is concerned contributing to more automatic timing.

It thus becomes obvious to those skilled in the art that a camera synchronizer is herein provided which requires no batteries for its operation, the electrical energy for operating the synchronizer and for igniting the photoflash lamp being supplied by a generator having a movable armature. Moreover, by the provision of a mechanical arrangement comprising a yoke and cam with a shifting lever ratio very little pressure is required to operate the synchronizer and to restore it to its initial position preparatory to another exposure. Also such synchronizer is provided with an arrangement for delaying or overcoming the inertia of the camera shutter tripping plunger thus decreasing the likelihood of shock causing inadvertent moving of the camera and synchronizer customarily attached thereto.

Although several embodiments of the present invention have been herein shown and described, it is to be understood that still further modifications thereof can be made without departing from the spirit and scope of the appended claims.

What is claimed is:

1. A camera synchronizer for opening a camera shutter simultaneously with the moment of peak intensity from a photoflash lamp comprising a casing, an electric generator in said casing including a magnet and a movable armature normally completing a magnetic circuit through said magnet and operable upon movement of said armature to generate electrical energy and cause ignition of said photoflash lamp, a pivoted member in said casing having a surface of varying radii of curvature and normally biased in fixed position, a slidable member operable by application of a relatively slight pressure thereto to first move said pivoted member about its axis against its normal bias and thereafter engageable with said armature to cause movement of the latter and abrupt breaking and making of the magnetic circuit with attendant generation of electrical impulses to ignite said photoflash lamp, means operable in response to further movement of said slidable member into engagement therewith to cause complete opening of the camera shutter in synchronism with the moment of peak intensity of said photoflash lamp, and said pivoted member being operable upon release of pressure on said slidable member to exert a varying reverse pressure on the latter, by engagement of the surface of varying radii of curvature of said pivoted member therewith, sufficient to return said slidable member and said armature to their initial positions.

2. A camera synchronizer for opening a camera shutter simultaneously with the moment of peak intensity from a photoflash lamp comprising a casing, an electric generator in said casing including a magnet and a movable armature normally completing a magnetic circuit through said magnet and operable upon movement of said armature to generate electrical energy and cause ignition of said photoflash lamp, a pivoted cam in said casing spring-biased in a fixed position, a slidable member having a portion engaging said cam and operable by application of a relatively slight pressure thereto to first move said cam about its axis against the spring-bias thereof and thereafter engageable with said armature to cause movement of the latter and abrupt breaking and making of the magnetic circuit with attendant generation of electrical impulses to ignite said photoflash lamp, means operable in response to further movement of said slidable member into engagement therewith to cause complete opening of the camera shutter in synchronism with the moment of peak intensity of said photoflash lamp, and said spring-biased pivoted cam being operable upon release of pressure on said slidable member to exert a varying reverse pressure on the latter sufficient to return said slidable member and said armature to their initial positions.

3. A camera synchronizer for opening a camera shutter simultaneously with the moment of peak intensity from a photoflash lamp comprising a casing, an electric generator in said casing including a magnet and a movable armature normally completing a magnetic circuit through said magnet and operable upon movement of said armature to generate electrical energy and cause ignition of said photoflash lamp, a pivoted cam in said casing spring-biased in a fixed position, a slidable yoke having a bifurcated portion, one arm of which is in engagement with said pivoted cam, and operable by application of a relatively slight pressure thereto to first move said cam about its axis against the spring-bias thereof and the other arm of said bifurcated portion being thereafter movable into engagement with said armature to cause movement of the latter and abrupt breaking and making of the magnetic circuit with attendant generation of electrical impulses to ignite said photoflash lamp, means operable in response to further movement of said slidable yoke into engagement therewith to cause complete opening of the camera shutter in synchronism with the moment of peak intensity of said photoflash lamp, and said pivoted cam being operable upon release of pressure on said yoke to exert a varying reverse pressure on the latter to return it together with said armature to their initial positions.

PHILIP K. McGALL.

REFERENCES CITED

The following references are of record in the file of this patent:

UNITED STATES PATENTS

| Number | Name | Date |
|---|---|---|
| 1,274,262 | Gruss | July 30, 1918 |
| 2,049,735 | Grogin | Aug. 14, 1936 |
| 2,321,945 | Schwartz et al. | June 15, 1943 |
| 2,328,831 | Mendelsohn | Sept. 7, 1943 |

FOREIGN PATENTS

| Number | Country | Date |
|---|---|---|
| 552,217 | Great Britain | Mar. 26, 1943 |